United States Patent
Nguyen

(10) Patent No.: US 10,348,123 B2
(45) Date of Patent: Jul. 9, 2019

(54) POWERING LOADS WITH A POWER SUPPLY AND AN UNINTERRUPTIBLE POWER SUPPLY

(71) Applicant: Hewlett Packard Enterprise Development LP, Houston, TX (US)

(72) Inventor: Hai Ngoc Nguyen, Spring, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 252 days.

(21) Appl. No.: 15/036,978

(22) PCT Filed: Dec. 14, 2013

(86) PCT No.: PCT/US2013/075216
§ 371 (c)(1),
(2) Date: May 16, 2016

(87) PCT Pub. No.: WO2015/088569
PCT Pub. Date: Jun. 18, 2015

(65) Prior Publication Data
US 2016/0294210 A1    Oct. 6, 2016

(51) Int. Cl.
*H02J 9/06* (2006.01)
*H02J 3/00* (2006.01)

(52) U.S. Cl.
CPC ............... *H02J 9/06* (2013.01); *H02J 9/061* (2013.01); *H02J 3/006* (2013.01)

(58) Field of Classification Search
CPC ............... H02J 9/06; H02J 9/061; H02J 3/006
See application file for complete search history.

(56) References Cited

U.S. PATENT DOCUMENTS

| 5,978,236 A | 11/1999 | Faberman et al. |
| 7,191,347 B2 | 3/2007 | Bigelow et al. |
| 7,337,333 B2 | 2/2008 | O'Conner et al. |
| 7,474,016 B2 | 1/2009 | Wang et al. |

(Continued)

FOREIGN PATENT DOCUMENTS

| CN | 103026573 A | 4/2013 |
| JP | 2005004379 A | 1/2005 |

(Continued)

OTHER PUBLICATIONS

ESpacenet.com translation of APP# JP 2012005324 A; dated Jan. 2012.*

(Continued)

*Primary Examiner* — Jared Fureman
*Assistant Examiner* — Michael J Warmflash
(74) *Attorney, Agent, or Firm* — Hewlett Packard Enterprise Patent Department

(57) ABSTRACT

A system in accordance with an example includes a first load and a second load. The first load includes a first power supply connected to a first uninterruptible power supply (UPS). The second load includes a second power supply connected to a second UPS, where the first UPS is connected to the second UPS. The first power supply is to deliver power to the first load and to the second load when power to the second load is disabled, and the second power supply is to deliver power to the second load and to the first load when power to the first load is disabled.

20 Claims, 5 Drawing Sheets

(56) References Cited

U.S. PATENT DOCUMENTS

| | | | |
|---|---|---|---|
| 7,898,106 B2* | 3/2011 | Groff | H02J 9/061 |
| | | | 307/18 |
| 8,344,546 B2 | 1/2013 | Sarti | |
| 8,415,831 B1 | 4/2013 | Hayes et al. | |
| 2007/0114852 A1* | 5/2007 | Lin | H02J 1/10 |
| | | | 307/66 |
| 2007/0273213 A1 | 11/2007 | Wang | |
| 2010/0211810 A1 | 8/2010 | Zacho | |
| 2012/0068541 A1 | 3/2012 | Anderson | |
| 2012/0086269 A1* | 4/2012 | Nakano | H02J 9/061 |
| | | | 307/23 |
| 2013/0111252 A1* | 5/2013 | Yoshida | G06F 1/30 |
| | | | 713/340 |

FOREIGN PATENT DOCUMENTS

| | | | | |
|---|---|---|---|---|
| JP | 2008022643 | | 1/2008 | |
| JP | 2012005324 A | * | 1/2012 | H02J 9/06 |
| JP | 2012005324 A | | 1/2012 | |

OTHER PUBLICATIONS

PCT, "International Search Report and Written Opinion," dated Sep. 12, 2014 for PCT/US2013/075216, filed Dec. 14, 2013, 12 pages.
Pelley, Steven et al., "Power Routing: Dynamic Power Provisioning in the Data Center," (Research Paper), ASPLOS, Mar. 13-17, 2010, Pittsburgh, Pennsylvania, http://citeseerx.ist.psu.edu/viewdoc/download?doi=10.1.1.215.4430&rep=rep1&type=pdf, 12 pages.

* cited by examiner

POWERING LOADS WITH A POWER SUPPLY AND AN UNINTERRUPTIBLE POWER SUPPLY

CROSS-REFERENCE TO RELATED APPLICATION

Pursuant to 35 U.S.C. § 371, this application is a United States National Stage Application of International Patent Application No. PCT/US2013/075216, filed on Dec. 14, 2013, the contents of which are incorporated by reference as if set forth in their entirety herein.

BACKGROUND

As technology advances, there is a greater dependence on providing reliability within a power system. The power system may include a redundant power supply to minimize losses when a power supply fails.

BRIEF DESCRIPTION OF THE DRAWINGS

Some examples of the present application are described with respect to the following figures.

DETAILED DESCRIPTION

Figure 1:
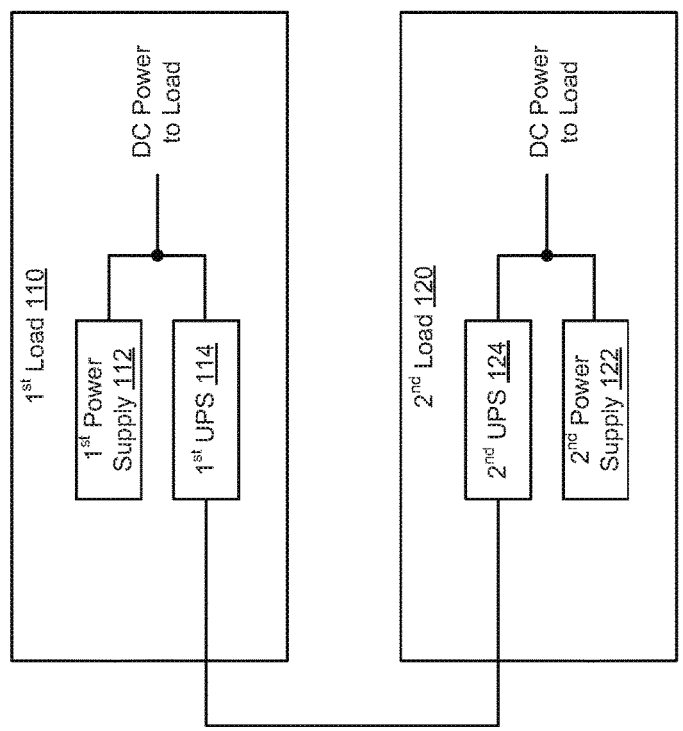
FIG. 1 illustrates an example of a system including first and second loads, where each load includes a power supply and an uninterruptible power supply (UPS)

A redundant power supply may protect a system when an unexpected power disruption in a main power supply occurs. For example, power availability redundancy is a high priority in a datacenter or an industrial system where uninterrupted power is desired. In such an example, a load (e.g., a computing system such as a server) may be provided with an uninterruptible power supply (UPS) in addition to a power supply (i.e., main power supply). A UPS is used to provide backup power to a load when the primary power supply, or mains, fails. The UPS provides power to the load from a battery (or batteries) in the load when the main power supply fails. Thus, the UPS is able to provide power at least for a limited time, until the main power supply is restored. Once the main power is restored, power from the main power supply is issued to recharge the battery in the UPS so that the battery is fully charged the next time there is a power outage.

Conventional redundant power supply systems provide dual power feeds to a given load (e.g., a server) that may include two independent power supplies, two independent power sources, and two independent UPS. This "double-up" power path approach provides a high assurance that power is available to a given single server. However, it also requires a double number of power supplies and UPS which translates to a double requirement of space, cost, and efficiency. Thus to provide redundancy between two servers, each server may require two independent power supplies, two UPS (to power the two power supplies), resulting in a total of four power supplies (i.e., two per load), four connection lines, and two UPS, where: the outputs of the two power supplies in each server are connected in order for the two power supplies to provide power to the same server; each power supply is designed to deliver all server power needs in the event either the other power supply fails, the other UPS fails, or loss of one of the two power sources; each UPS is designed to provide backup power to all servers connected to the same UPS in the event the other UPS fails or loss of one of the two power sources.

To address the issues of space, cost, and efficiency associated with the above double-up power approach, the described examples provide a power supply and UPS system that interconnects between two loads, and allows two adjacent loads to share power resources and to provide power redundancy between the two loads while reducing the number of power supply and UPS (e.g., by half). For example, each load is provided with a power supply and a UPS that are connected. The UPS of a first load is connected to the UPS of a second load to provide power redundancy by sharing power resources.

In one example, a system includes a first load and a second load. The first load includes a first power supply connected to a first uninterruptible power supply (UPS). The second load includes a second power supply connected to a second UPS, where the first UPS is connected to the second UPS. The first power supply is to deliver power to the first load and to the second load when power to the second load is disabled. The second power supply is to deliver power to the second load and to the first load when power to the first load is disabled.

In another example, a method includes providing a first load with a first power supply and a first uninterruptible power supply (UPS), where the first power supply is connected to the first UPS. The method includes providing a second load with a second power supply and a second UPS, where the second power supply is connected to the second UPS, and where the first UPS is connected to the second UPS. The method includes delivering power to the first load and to the second load via the first power supply, in response to detecting that power to the second load is disabled. The method also includes delivering power to the second load and to the first load via the second power supply, in response to detecting that power to the first load is disabled.

In another example, a non-transitory computer-readable storage medium includes instructions executable by a processor of a computing device to deliver power to a first load and to a second via a first power supply of the first load, when power to the second load is disabled. The instructions are executable to deliver power to the first load and to the second load via a second power supply of the second load, when power to the first load is disabled. The first load includes a first uninterruptible power supply (UPS) connected to the first power supply, the second load includes a second UPS connected to the second power supply, and the first UPS is connected to the second UPS.

Referring now to the figures, FIG. 1 is an example of a system including first load and second loads, where each load includes a power supply and an uninterruptible power supply (UPS). The system 100 of FIG. 1 includes a first load 110 and a second load 120. First and second loads 110-120 may be adjacent to each other. Further, first and second loads 110-120 can be, for example, a computing system/device such as a server, network switches and routers, or any other electrical device.

The first load 110 can include a first power supply 112 and a first UPS 114 connected together and configured to provide power to the first load 110 via a first rail 115. The first power supply 112 is a primary power supply to provide power to the first load 110 via the first rail 115. The first UPS 114 is a backup power supply to provide power to the first load 110 via the first rail 115 when the first power supply 112 fails. The first power supply 112 and the first UPS 114 are connected to the first rail 115, such that at least one of the first power supply 112 and the first UPS 114 can provide power to the first load 110. For example, first power supply 112 and first UPS 114 can provide direct current to the first load 110. In some examples, first power supply 112 can provide power to the first UPS 114, and the power can be stored in a battery (not shown) of the first UPS 114, so that the first UPS 114 can provide the stored power to the first load 110 when the first power supply 112 fails. For example, first UPS 114 can store direct power provided by first power supply 112 in one or more batteries of the first UPS 114.

Similar to first load 110, second load 120 can include a second power supply 122 and a second UPS 124. Second power supply 122 and second UPS 124 can be connected together to provide power to the second load 120 via a second rail 125. The second power supply 122 is a primary power supply to provide power to the second load 120 via the second rail 125. The second UPS 124 is a backup power supply to provide power to the second load 120 via the second rail 125 when the second power supply 122 fails. Thus, the second power supply 122 and the second UPS 124 are connected to the second rail 125 such that at least one of the second power supply 122 and the second UPS 124 can provide power to the second load 120. For example, second power supply 122 and second UPS 124 can provide direct current to the second load 120. In some examples, second power supply 122 can provide power to the second UPS 124, and the power can be stored in a battery (not shown) of the second UPS 124, so that the second UPS 124 can provide the stored power to the second load 120 when the second power supply 122 fails. For example, second UPS 124 can store direct power provided by second power supply 122 in one or more batteries of the second UPS 124.

Thus power redundancy is achieved in each of the first load 110 and the second load 120 by providing each load 110-120 with a power supply (i.e., a main power supply) and a UPS (i.e., a backup power supply). As shown in FIG. 1, the power supply and the UPS are internal to the loads 110-120. In some examples, first and second UPS 114-124 are micro-UPS (mUPS) that can provide cost and space savings in the first and second loads 110-120, and improve efficiency of the system 100.

Additional redundancy is provided in the system 100 of FIG. 1 by connecting the first UPS 114 of the first load 110 to the second UPS 124 of the second load 120. Thus, the first and second loads 110-120 are able to share power resources. In certain examples, the output of the power supply/UPS connection in each load i.e., the first rail 115 and second rail 125) is brought out to the rear (i.e., a back side/panel such as the back side of a server where the power connections and cablings are ran) of the UPS, and the UPS rear connection 116 from one load is connected to the UPS rear connection 126 of another load. Accordingly, the outputs of the power supplies 112, 122 of the two loads 110-120 (i.e., the first rail 115 and the second rail 125) are directly connected to each other. This enables the power supply from one load to power the other load in the event one of the power supplies fails, for example.

In some examples, at least one of the first UPS 114 and the second UPS 124 can deliver power to the first load 110 and to the second load 120 when the first power supply 112 and the second power supply 122 are disabled or fail. In such examples, because the first power supply 112 (of the first load 110) serves as a backup power for the second load 120 and the second power supply 122 (of the second load 120) serves as a backup power for the first load 110, if both first and second power supplies fail, the system reverts to either the first UPS 114 and/or the second UPS 124 for backup power for the first load 110 and the second load 110.

To illustrate, the first UPS 114 can deliver power to the first load 110 and to the second load 120 when the first power supply 112 and the second power supply 122 fail (or are disabled), until power is restored to the first power supply 112 or the second power supply 122. Similarly, the second UPS 124 can deliver power to the first load 110 and to the second load 120 when the first power supply 112 and the second power supply 122 fail, until power is restored to the first power supply 112 or the second power supply 122.

Figure 2:
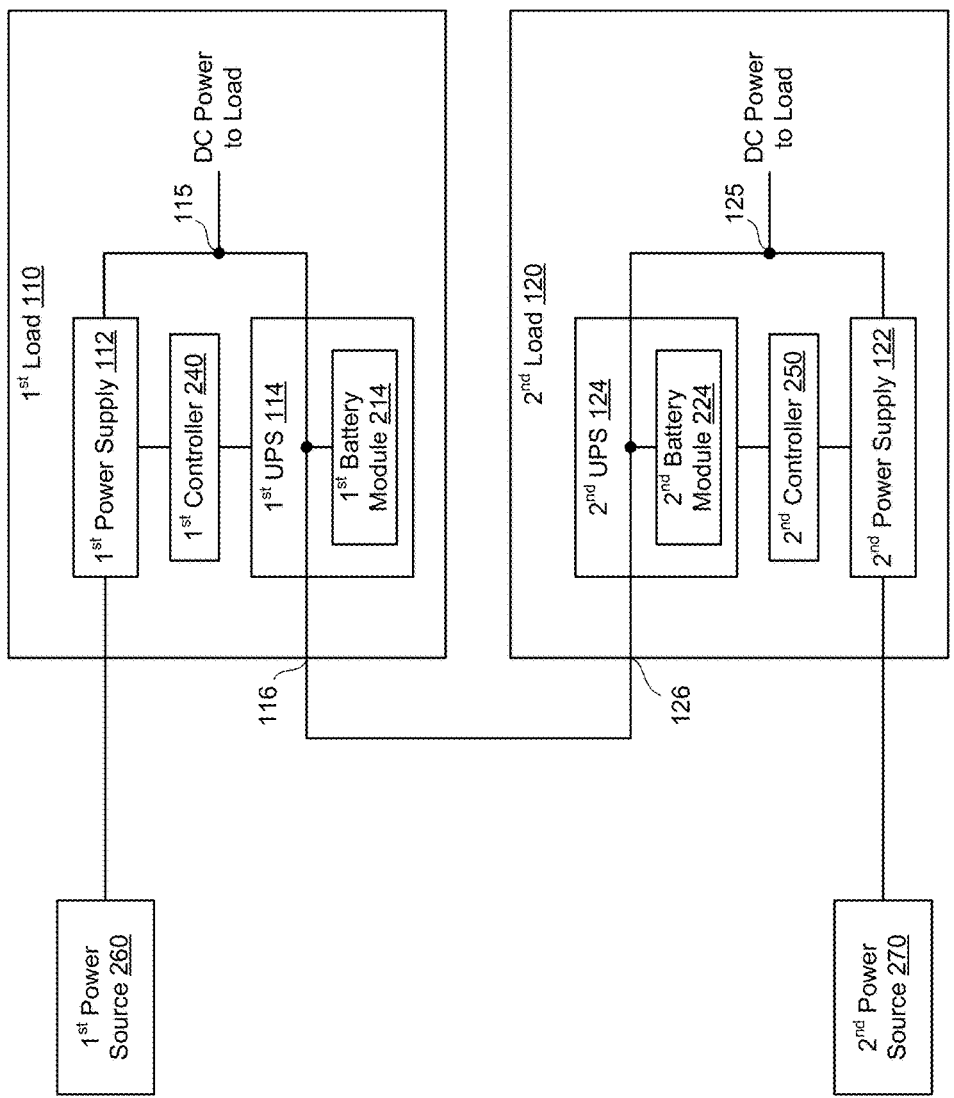
FIG. 2 illustrates another example of a system including first and second loads, where each load includes a power supply and an uninterruptible power supply (UPS)

FIG. 2 is another example of a system including first and second loads, where each load includes a power supply and an uninterruptible power supply (UPS). In the example of FIG. 2, system 200 includes the first power supply 112 connected to a first power source 260 and the second power supply 122 connected to a second power source 270.

First power source 260 and second power source 270 can include power grids or power source from utility companies, for example. Thus, first and second power sources 260-270, can provide power to the first power supply 112 and the second power supply 122, respectively. In some examples, first and second power sources 260-270 deliver AC or DC to the first and second power supplies 112-122. If AC is delivered, first and second power supplies 112-122 can convert the AC to DC. For example, each of the first power supply 112 and the second power supply 122 can include an AC-DC converter to convert the AC from the first power source 260 and second power source 270 to DC, where the DC is delivered to the first load 110 and the second load 120 and to the first UPS 114 and the second UPS 124.

First UPS 114 includes a first battery module 214 and second UPS 124 includes a second battery module 224. The first battery module 214 and the second battery module 224 are to store power provided by respective first power supply 112 and second power supply 122. Thus, first power supply 112 and second power supply 122 can charge the batteries 214-224. The stored power is delivered to the first load 110 and the second load 120 when both the first power supply 112 and second power supply 122 fail.

In certain examples, the first load 110 includes a first controller 240 connected to the first power supply 112 and to the first UPS 114, and the second load 120 includes a second controller 250 connected to the second power supply 122 and to the second UPS 124. The first controller 240 can be a combination of hardware and software to manage the functioning of the first power supply 112 and the first UPS 114, by transmitting and/or receiving signals from the first power supply 112 and the first UPS 114. Similarly, the second controller 250 can be a combination of hardware and software to manage the functioning of the second power supply 122 and the second UPS 124, by transmitting and/or receiving signals from the second power supply 122 and the second UPS 124.

In one example, the first controller 240 can determine when the first power supply fails 112 and notify the first UPS 114, so that the first UPS 114 can provide backup power to the first load 110. Similarly, the second controller 250 can determine when the second power supply 122 fails and notify the second UPS 124, so that the second UPS 124 can provide backup power to the second load 120. It should be noted that system 200 can include one or more controllers that manage the functionality of the power supplies and UPS in each of the loads of the system 200 to determine when one or more of the power supplies fails and direct one or more UPS to provide power to the loads.

Figure 3:
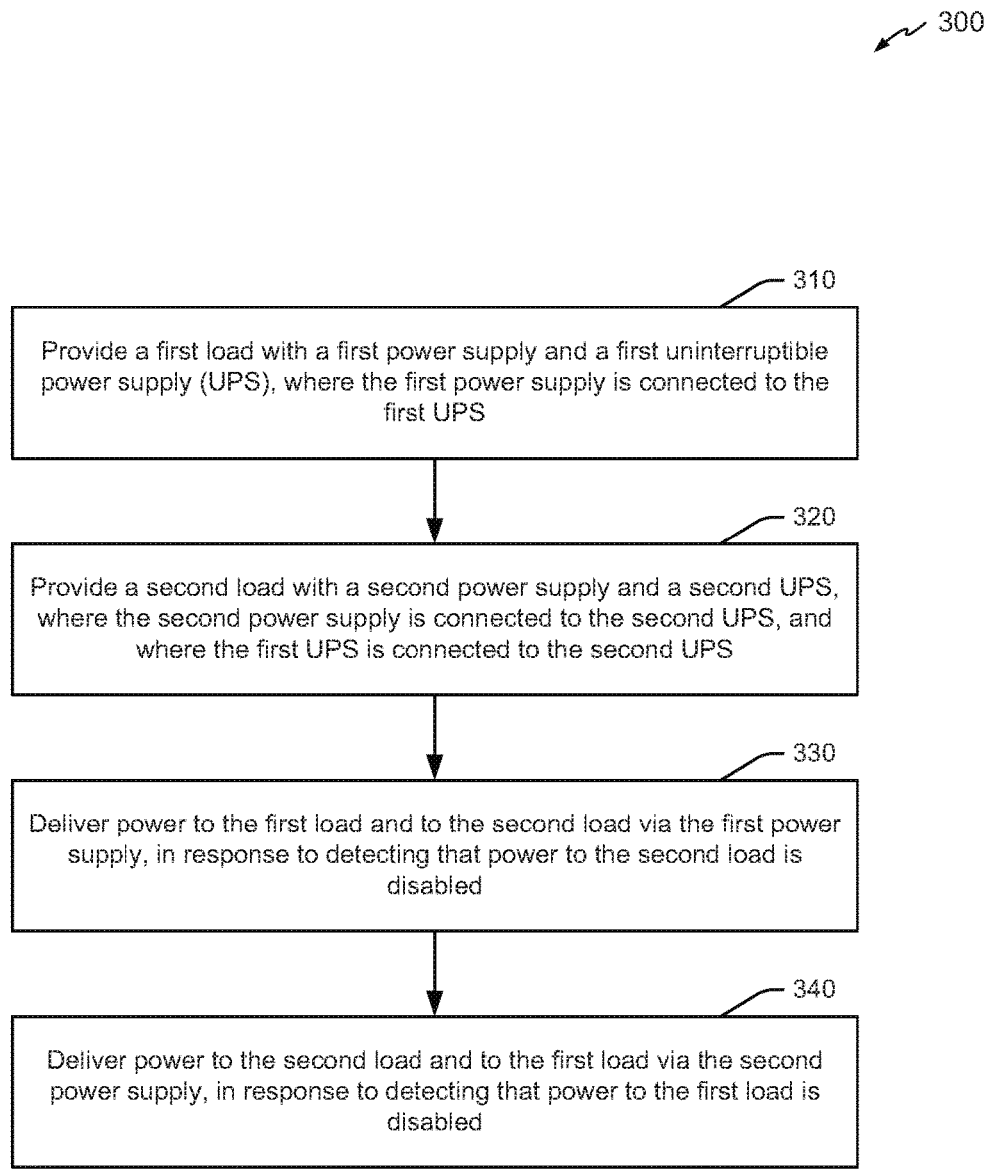
FIG. 3 is a flowchart of an example method for providing power to a first load and a second load, where each load includes a power supply and an uninterruptible power supply (UPS)

FIG. 3 is an example flowchart illustrating a method for providing power to a first load and a second load, where each load includes a power supply and an uninterruptible power supply (UPS). Method 300 may be implemented, for example, in the form of executable instructions stored on a non-transitory computer-readable storage medium and/or in the form of electronic circuitry.

Method 300 includes providing a first load with a first power supply and a first UPS, where the first power supply is connected to the first UPS, at 310. For example, the first load 110 can include first power supply 112 (e.g., a main power supply) and first UPS 114 (e.g., a backup power supply). The first power supply 112 and the first UPS 114 are connected together to deliver power (e.g., DC power) to the first load 110.

Method 300 includes providing a second load with a second power supply and a second UPS, where the second power supply is connected to the second UPS, and where the first UPS is connected to the second UPS, at 320. For example, the second load 120 can include second power supply 122 (e.g., a main power supply) and second UPS 124 (e.g., backup power supply). The second load 120 is adjacent to the first load 110 and can share power resources (i.e., power supply and UPS) with the first load 110, by connecting the first UPS 114 of the first load to the second UPS 124 of the second load 120.

Method 300 includes delivering power to the first load and to the second load via the first power supply, in response to detecting that power to the second load is disabled, at 330. For example, the first power supply 112 can deliver power to the second load 120 (i.e., backup power) when the second power supply 122 fails, while also delivering power to the first load 110.

Method 300 also includes delivering power to the second load and to the first load via the second power supply, in response to detecting that power to the first load is disabled, at 340. For example, the second power supply 122 can deliver power to the first load 110 (i.e., backup power) when the first power supply 112 fails, while also delivering power to the second load 120. In some examples, the method 300 of FIG. 3 includes additional steps in addition to and/or in lieu of those depicted in FIG. 3.

Figure 4:
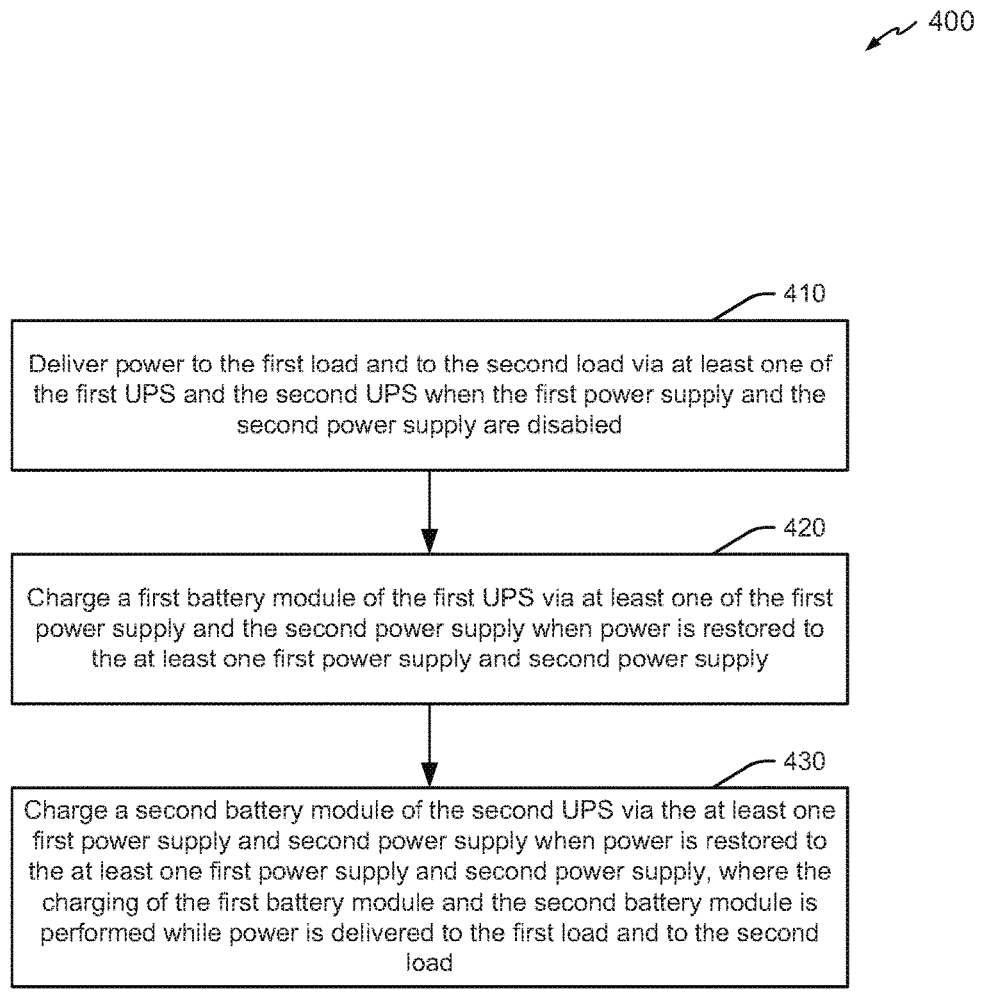
FIG. 4 is a flowchart of another example method for providing power to a first load and a second load, where each load includes a power supply and an uninterruptible power supply (UPS)

FIG. 4 is an example flowchart illustrating another method for providing power to a first load and a second load, where each load includes a power supply and a UPS. Method 400 may be implemented, for example, in the form of executable instructions stored on a non-transitory computer-readable storage medium and/or in the form of electronic circuitry.

Method 400 includes delivering power to the first load and to the second load via at least one of the first UPS and the second UPS when the first power supply and the second power supply are disabled, at 410. For example, either one of the first UPS 114 and the second UPS 124 can deliver power to the first load and to the second load when the first power supply 112 and the second power supply 122 fails, because both the first load 110 and the second load 120 share power resources. For example, both loads 110-120 can share the first power supply 112 and the second power supply 122, as well as the first UPS 114 and the second UPS 124, by connecting the first UPS 114 of the first load 110 to the second UPS 124 of the second load 120.

Method 400 includes charging a first battery module of the first UPS via at least one of the first power supply and the second power supply when power is restored to the at least one first power supply and second power supply, at 420. For example, the first battery module 224 can be charged by one or both of the first power supply 112 and second power supply 122 when power is restored to the first power supply 112 and second power supply 122.

Method 400 also includes charging a second battery module of the second UPS via the at least one first power supply and second power supply when power is restored to the at least one power supply and second power supply, where the charging of the first battery module and the second battery module is performed while power is delivered to the first load and to the second load, at 430. For example, the second battery module 224 can be charged by at least one of the first power supply 112 and second power supply 112 when power is restored. Further, charging of the battery modules 214-224 can be done simultaneously with providing power to the first load 110 and the second load 120. In some examples, the method 400 of FIG. 4 includes additional steps in addition to and/or in lieu of those depicted in FIG. 4.

Figure 5:
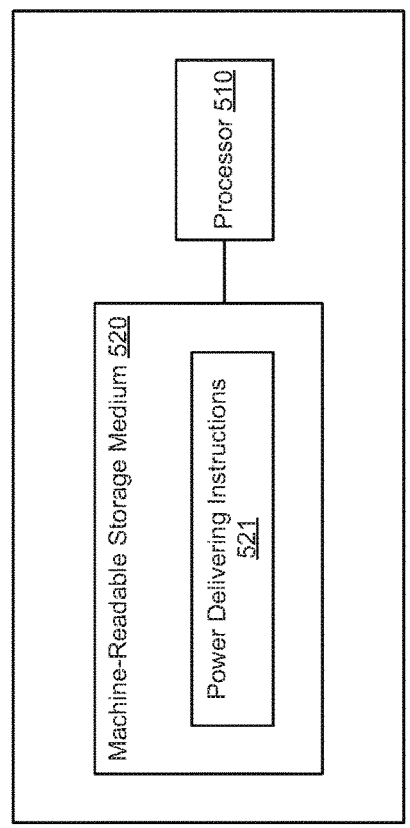
FIG. 5 illustrates an example of a computing system including a computer-readable medium having instructions executable by a processor to provide power to a first load and a second load, where each load includes a power supply and an uninterruptible power supply (UPS).

FIG. 5 illustrates an example of a computing system including a computer-readable medium having instructions executable by a processor to provide power to a first load and a second load, where each load includes a power supply and an uninterruptible power supply (UPS). System 500 can include non-transitory computer-readable medium 520. The medium 520 can include instructions 521 that if executed by a processor 510 can perform the functionality described below.

For example, the instructions 521 can be executed to: deliver power to a first load and to a second load via a first power supply of the first load when power to the second load is disabled; and deliver power to the first load and to the second load via a second power supply of the second load when power to the first load is disabled. The first load includes a first UPS connected to the first power supply, the second load includes a second UPS connected to the second power supply, and the first UPS of the first load is connected to the second UPS of the second load. The instructions 521 can also be executed to deliver power to the first load and to the second load via at least one of the first UPS and the second UPS when the first power supply and the second power supply are disabled.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A system comprising:
  a first server comprising:
    a first power supply that converts input power into DC power that is output to a first rail that powers the first server, and
    a first backup power supply that outputs DC power to the first rail; and
  a second server comprising:
    a second power supply that converts input power into DC power that is output to a second rail that powers the second server, and
    a second backup power supply that outputs DC power to the second rail;
  wherein the first rail is directly electrically connected to the second rail such that the first power supply and the first backup power supply can provide power to the second server and the second power supply and the second backup power supply can provide power to the first server.

2. The system of claim 1,
  wherein the first power supply and the first backup power supply are housed within the first server, and
  the second power supply and the second backup power supply are housed within the second server.

3. The system of claim 2,
  wherein the first rail is electrically connected to the second rail by way of current path that exits the rear of the first server and enters the rear of the second server.

4. The system of claim 3,
  wherein the first backup power supply has a first rear power connection that is electrically connected to the first rail and the second backup power supply has a second rear power connection that is electrically connected to the second rail, and
  the first rear power connection is electrically connected to the second rear power connection as part of the current path between the first rail and the second rail.

5. The system of claim 1,
  wherein the first backup power supply comprises a first battery to output the DC power to the first rail,
  the second backup power supply comprises a second battery to output the DC power to the second rail, and
  the first and second batteries are both charged by both the first and second rails.

6. The system of claim 1,
  wherein the first rail is directly electrically connected to the second rail by way of a power connection of the first backup power supply that is electrically connected to a power connection of the second backup power supply.

7. The system of claim 1, comprising
  a first power source that provides the input power to the first power supply, where the input power provided to the first power supply is AC power; and
  a second power source that provides the input power to the second power supply, where the input power provided to the second power supply is AC power.

8. The system of claim 1, comprising
  a first power source that provides the input power to the first power supply, where the input power provided to the first power supply is DC power; and
  a second power source that provides the input power to the second power supply, where the input power provided to the second power supply is DC power.

9. The system of claim 1,
  wherein the first server comprises a first controller to control whether the first backup power supply outputs power to the first rail; and
  the second server comprises a second controller to control whether the second backup power supply outputs power to the second rail.

10. The system of claim 9,
  wherein the first controller is to cause the first backup power supply to output power to the first rail when the first power supply fails; and
  the second controller is to cause the second backup power supply to output power to the second rail when the second power supply fails.

11. A system comprising:
  a first computing device comprising:
    a first power supply that converts input power into DC power that is output to a first rail that powers the first computing device, and
    a first backup power supply that outputs DC power to the first rail; and
  a second computing device comprising:
    a second power supply that converts input power into DC power that is output to a second rail that powers the second computing device, and
    a second backup power supply that outputs DC power to the second rail;
  wherein the first rail is directly electrically connected to the second rail such that the first power supply and the first backup power supply can provide power to the second computing device and the second power supply and the second backup power supply can provide power to the first computing device.

12. The system of claim 11,
  wherein the first power supply and the first backup power supply are housed within the first computing device, and
  the second power supply and the second backup power supply are housed within the second computing device.

13. The system of claim 12,
  wherein the first rail is electrically connected to the second rail by way of current path that exits the rear of the first computing device and enters the rear of the second computing device.

14. The system of claim 13,
  wherein the first backup power supply has a first rear power connection that is electrically connected to the first rail and the second backup power supply has a second rear power connection that is electrically connected to the second rail, and
  the first rear power connection is electrically connected to the second rear power connection as part of the current path between the first rail and the second rail.

15. The system of claim 11,
wherein the first backup power supply comprises a first battery to output the DC power to the first rail,
the second backup power supply comprises a second battery to output the DC power to the second rail, and
the first and second batteries are both charged by both the first and second rails.

16. The system of claim 11,
wherein the first rail is directly electrically connected to the second rail by way of a power connection of the first backup power supply that is electrically connected to a power connection of the second backup power supply.

17. The system of claim 11, comprising
a first power source that provides the input power to the first power supply, where the input power provided to the first power supply is AC power; and
a second power source that provides the input power to the second power supply, where the input power provided to the second power supply is AC power.

18. The system of claim 11, comprising
a first power source that provides the input power to the first power supply, where the input power provided to the first power supply is DC power; and
a second power source that provides the input power to the second power supply, where the input power provided to the second power supply is DC power.

19. The system of claim 11,
wherein the first computing device comprises a first controller to control whether the first backup power supply outputs power to the first rail; and
the second computing device comprises a second controller to control whether the second backup power supply outputs power to the second rail.

20. The system of claim 19,
wherein the first controller is to cause the first backup power supply to output power to the first rail when the first power supply fails; and
the second controller is to cause the second backup power supply to output power to the second rail when the second power supply fails.

* * * * *